United States Patent [19]

Lopic

[11] 4,104,795
[45] Aug. 8, 1978

[54] ELECTRICAL CUTTING APPLIANCES

[75] Inventor: Franc Lopic, Burlafingen, Fed. Rep. of Germany

[73] Assignee: Gardena Kress & Kastner GmbH, Ulm, Fed. Rep. of Germany

[21] Appl. No.: 731,584

[22] Filed: Oct. 12, 1976

[30] Foreign Application Priority Data

Oct. 14, 1975 [DE] Fed. Rep. of Germany ....... 2545838

[51] Int. Cl.² .............................................. B26B 7/00
[52] U.S. Cl. .................................... 30/272 A; 30/228;
30/DIG. 1; 200/51 LM; 200/157
[58] Field of Search .............. 30/DIG. 1, 228, 272 A;
200/51 LM, 157

[56] References Cited

U.S. PATENT DOCUMENTS

| 1,744,368 | 1/1930 | Derfler | 30/228 |
|---|---|---|---|
| 2,263,136 | 11/1941 | Knouse et al. | 200/157 X |
| 2,480,827 | 9/1949 | Armstrong | 200/51 LM |
| 2,509,008 | 5/1950 | McFarland | 200/157 X |
| 3,097,430 | 7/1963 | Levinski et al. | 30/273 |
| 3,417,470 | 12/1968 | Damon | 30/276 |
| 3,536,976 | 10/1970 | Briskman et al. | 30/228 X |
| 3,623,223 | 11/1971 | Edgell et al. | 30/DIG. 1 |
| 3,759,020 | 9/1973 | Simmons | 30/DIG. 1 |
| 3,805,385 | 4/1974 | Ritums et al. | 30/DIG. 1 |

FOREIGN PATENT DOCUMENTS 427,037  4/1935  United Kingdom ................... 200/157

Primary Examiner—Al Lawrence Smith
Assistant Examiner—J. T. Zatarga
Attorney, Agent, or Firm—Pennie & Edmonds

[57] ABSTRACT

An electrical cutting appliance is provided with a housing and cutting or shearing blades driven from a motor. The motor, incorporated in the main electrical circuit of the appliance, is connectible to a source of electrical energy through external switching contacts which are outside and separate from said housing and which also are included in the main electrical circuit, the appliance only being operable when the external contacts are closed.

3 Claims, 6 Drawing Figures

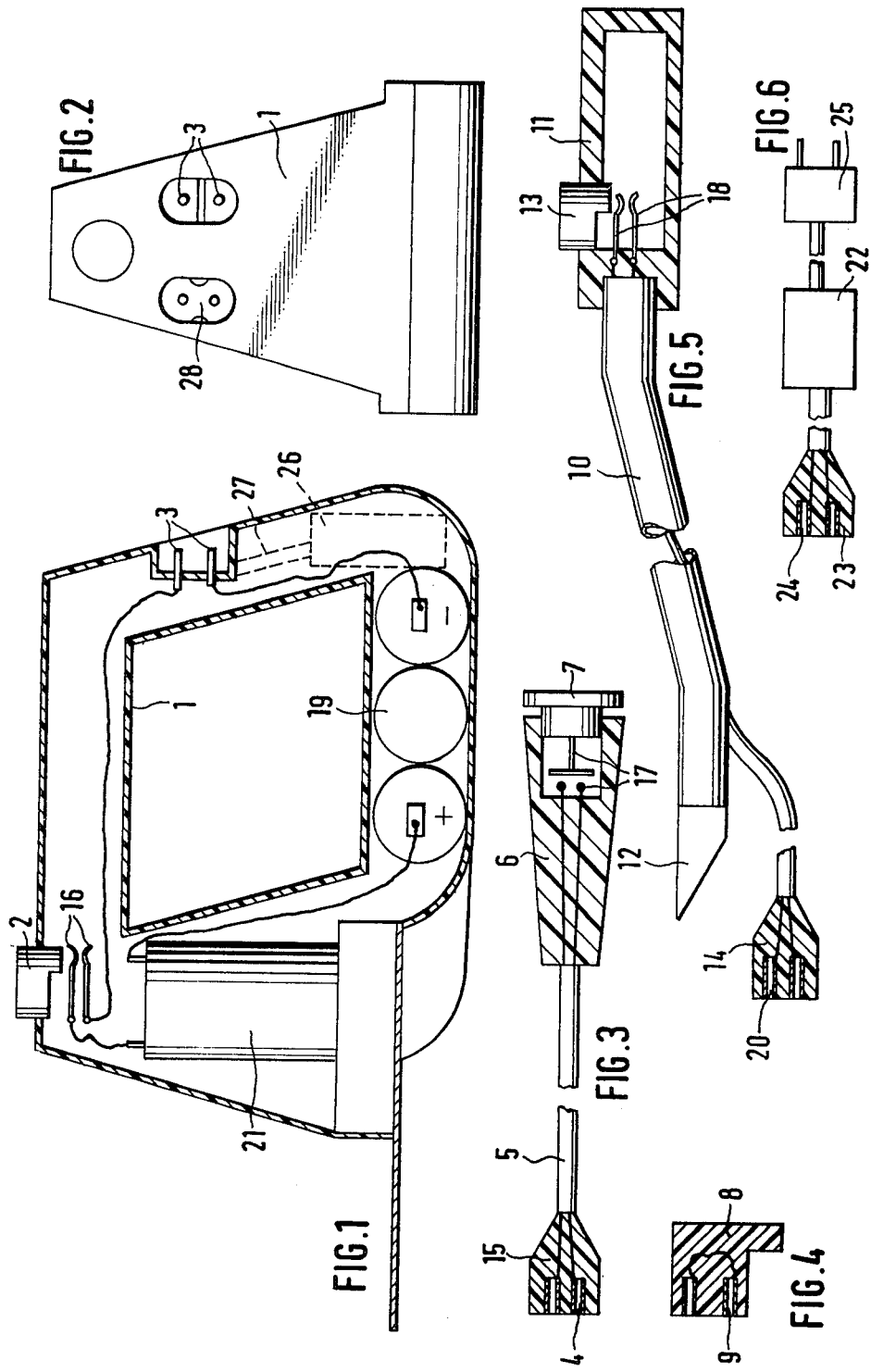

ELECTRICAL CUTTING APPLIANCES

The invention relates to an electrical cutting appliance, particularly grass shears and/or hedge shears, having an electric motor, electrically driven cutting or shearing blades, a source of electrical energy or a supply line leading thereto, and switching contacts for connecting the motor to the source of energy.

Since efficient rechargeable batteries of small dimensions have been available, battery-driven grass shears have been widely used for cutting the edges of lawns and for cutting grass. These lawn shears which, to some extent, may also be used as hedge shears when the branches to be cut are not too thick, constitute a source of danger despite the relatively low drive power, since, for example, fingers might unintentionally come into contact with the moving shearing blades and thus be injured. Serious injury can occur, particularly in the case of hedge shears.

In battery-operated lawn shears, it is known to use a handle which has an actuating switch at its end remote from the appliance. However, this switch is located in a parallel electrical circuit with the main switch in the appliance itself. Therefore, the appliance can be put into operation by actuating the switch provided in the appliance, even when using the extension handle. Thus, in this instance, the handle facilitates operation of the appliance, but does not constitute a protective device for avoiding injury in all cases.

Therefore, an aim of the invention is to provide an electrical cutting appliance, particularly battery-operated grass shears and/or hedge shears, which is connected to a protective device which, when the appliance is in its rest state and when it is in use, reduces the risk of personal injury by unintentionally putting the appliance into operation or touching the blades.

In accordance with the present invention there is provided an electrical cutting appliance, such as grass shears and/or hedge shears, having an electric motor, electrically driven cutting or shearing blades, a source of electrical energy, and switching contacts for connecting the motor to the source of energy, which contacts comprise external switching contacts provided outside the actual cutting appliance and connectible to the motor by way of electrical leads, said external contacts being located in the main electrical circuit of the appliance so that, when operated in accordance with instructions, the appliance is operable only by closing the external switching contacts.

Thus, in contrast to the known appliance having a handle extension, the appliance in accordance with the invention has only a single main circuit. The external switching contacts are located in this circuit. Thus, the hand not holding the appliance can operate a second grip which can conveniently be held and in which the external electrical switching contacts are preferably arranged. This grip can be connected to the grass shears or hedge shears or to some other electrical appliance by way of a cable of appropriate length and by means of a plug so that the appliance cannot be put into operation without inserting the cable and actuating the external switching contacts. If internal contacts are at the same time provided in the same main electrical circuit and are electrically connected in series with the external switching contacts, the appliance can be put into operation only by closing all the switching contacts.

In accordance with a further development of the invention, a bridging key in the form of a plug is provided by means of which the external switching contacts may be by-passed. This bridging key can be used in special cases of application when the appliance is to be operable solely by closing the internal switching contacts. The main purpose of the bridging key is that it can be kept separately from the actual appliance, so that it serves to hinder children from operating the appliance. Thus, the appliance cannot be put into operation in the absence of the key or other external switching contacts.

The invention is described further, by way of example, with reference to the accompanying drawings, in which:

FIG. 1 is a longitudinal section through a battery-operated lawn-cutter,

FIG. 2 is a rear view of the embodiment of FIG. 1,

FIG. 3 shows the possibility of providing external contacts for the embodiment of FIG. 1, FIG. 4 shows a bridging key, FIG. 5 shows a guide handle with built-in switching contacts, and FIG. 6 shows an external charger with plugs on the primary and secondary sides.

In the embodiment of the invention illustrated in the drawings, a battery-operated lawn-cutter 1 is provided with rechargeable batteries 19, an electric motor 21 and internal leaf-spring type switching contacts 16 which are operable by means of a switching member 2 mounted in the housing of the appliance 1. An electrical coupling member 3 is located in the main electrical circuit comprising the battery, motor and contacts 16, which coupling member is arranged in the housing of the appliance and interrupts the main electrical circuit. Furthermore, a charger 26 is fitted in the appliance 1 in a conventional manner and is connected by way of an electrical lead 27 to a socket 28 for the insertion of a charging cable.

The appliance is not operable solely by closing the contacts 16. On the contrary, for the purpose of operating the appliance, the main electrical circuit has to be closed in the first instance by short-circuiting the contacts in the coupling member 3. For this purpose, as is shown in FIG. 3, a plug 15 having electrical contacts 4 is provided and is insertable into the coupling member 3 and is connected to a hand grip 6 by way of an extension cable 5, external switching contacts 17 being arranged in the hand grip 6. The switching contacts 17 are interconnectible by means of a trigger button 7. The plug 15 may be inserted into the coupling member 3 for the purpose of operating the grass shears. The motor is connected to the batteries 19 only by simultaneously closing the internal contacts 16 and the external contacts 17 remote therefrom, two hands being required for this purpose. Both the operator's hands are therefore occupied, thus preventing injury by unintentional contact with the cutting blades.

Alternatively, as is shown in FIG. 5, it is also possible to insert the end of an extension handle or guide handle 10 into the upper grip portion of the housing 1, and a plug 14, having contact pins 20, into the coupling member 3. An electrical cable extends through the handle from the plug 14 into the handle grip 11 in which are arranged external leaf-spring type switching contacts 18 which are closable by a switching member 13 against the force of a spring. Since, during operation of the appliance, the handle grip can be at too great a distance from the appliance for the internal switching contacts to be closable by the other hand by means of the switching member 2, in this embodiment a wedge-shaped switching element 12 is provided at that end of the handle which is insertible into the appliance and, upon insertion, closes the switching contacts 16. Thus, in this embodiment also, only one electric circuit is provided by means of which the motor can be put into operation. This electrical circuit leads by way of the external switching contacts 18.

In accordance with a special embodiment, a bridge plug 8 is provided for closing the contacts 3 of the coupling member provided in the housing of the appliance 1, the contact pins 9 of which bridge plug are electrically interconnected. This bridge plug can be kept separately from the battery-operated shears, so that the shears cannot be operated by unauthorized persons or children. The motor can be put into operation upon actuating the internal switching contacts 16 only when the contact pins 9 act as external switching contacts to close the circuit upon inserting the plug 8 in the manner of a key. When using the bridge plug 8, the internal switching contacts 16 are required for interrupting or closing the main circuit. On the other hand, the internal switching contacts 16 can also be dispensed with if the external switches (as are shown in FIGS. 3 and 5) are used. The external contacts 17 or 18 are then sufficient for solely interrupting or solely closing the circuit.

In accordance with a further development of the invention, and as is shown in FIG. 6, an external charger 22 is provided and is connected to a mains plug 25 and an appliance plug 23. The contact pins 24 of the appliance plug 23 are insertible into the coupling member 3 in the housing of the appliance 1. The internal switching contacts 16 can be closed at the same time by means of a switching element (not illustrated in the drawings) of similar construction to the tip 12 of the guide handle 10. The charging current then flows through the closed switching contacts 16 and the motor 21 to the batteries 19. The charging current is usually only 0.1 A. Since the motor requires a current of 1 A for starting, the motor 21 is stationary when charging the batteries by way of the main circuit.

The invention is not confined to the embodiments illustrated. On the contrary, it is possible to modify these embodiments. Thus, the batteries may be arranged outside the housing of the shears. For this purpose, for example, a separate battery housing can be provided whose outside is provided with locally fixed contacts which are connectible to corresponding counter-contacts arranged on the housing of the appliance 1. Thus, the batteries can be interchanged in a simple manner and, if required, charged at a location remote from the appliance 1.

I claim:

1. An electrical cutting appliance having a housing, blades, a motor for driving said blades, a primary electrical circuit incorporating said motor, a source of electrical energy within said appliance, and two pairs of switching contacts in series in said primary circuit for connecting said motor to said source of energy, one of said pairs of switching contacts being located externally of said housing, said housing having a manual grip, said external contacts being spaced from said grip a distance sufficient to insure that said contacts cannot be actuated by a single hand holding said grip, the second of said pairs of switching contacts being located internally of said housing adjacent said grip, means for actuating said internal switching contacts, and a removable electrical plug means for connecting and disconnecting said external switching contacts to each other whereby said plug means must be used for operation of said appliance.

2. The appliance of claim 1 in which said plug means includes a plug element having contacts engageable and disengageable with said external contacts, manually operable switch means, electrical leads connecting said manually operable switch means to the contacts of said plug element whereby upon engagement of said plug means with said external contacts said connection and disconnection of the external contacts to each other is effected by operation of said manually operated switch.

3. The appliance of claim 1 in which said plug means includes a pair of contacts engageable respectively with said external contacts, and an electrical lead interconnecting the contacts of said plug means whereby connection and disconnection of the external contacts to each other is effected by engaging and disengaging said plug means with said external contacts.

* * * * *